April 2, 1940.  A. D. OWEN  2,195,708
FLUID SEAL
Filed July 1, 1938
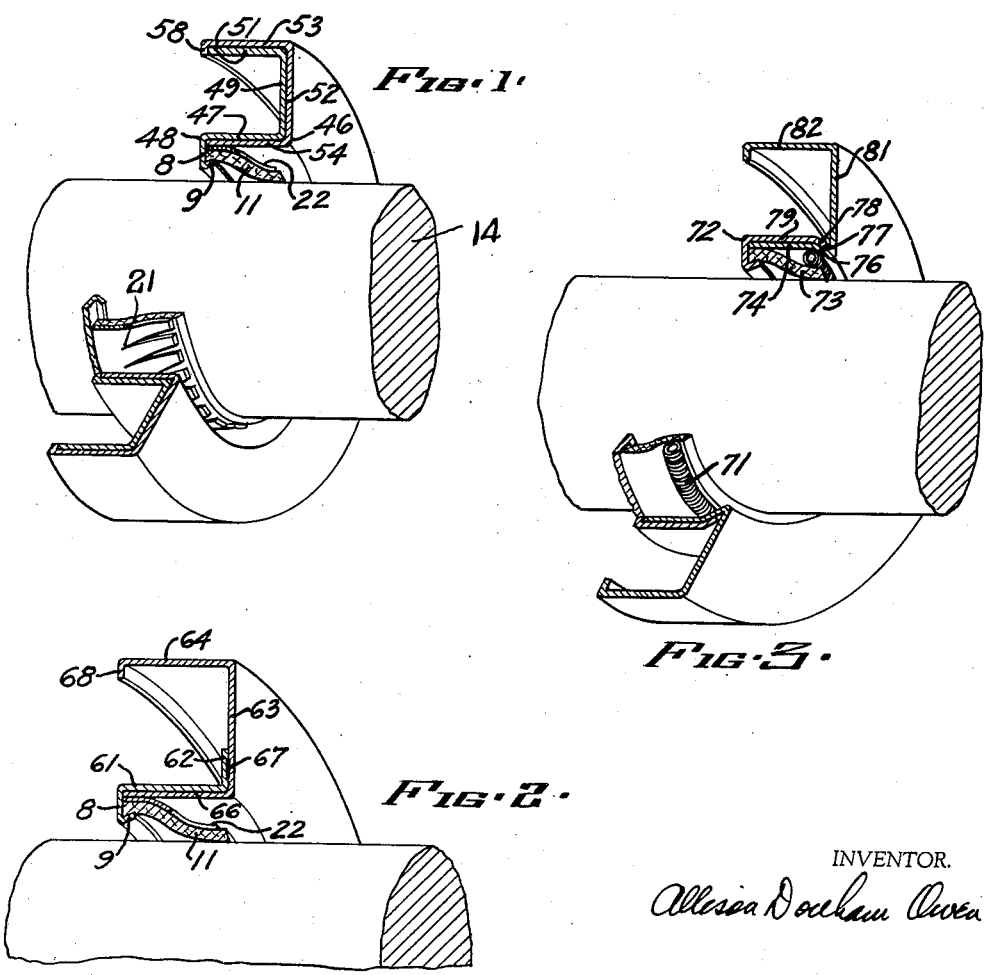
INVENTOR.
Alleson Dockam Owen Patented Apr. 2, 1940

2,195,708

UNITED STATES PATENT OFFICE 2,195,708

FLUID SEAL

Allison Donham Owen, Berkeley, Calif., assignor to National Oil Seal Co., Oakland, Calif., a corporation of Nevada Application July 1, 1938, Serial No. 216,985

2 Claims. (Cl. 288—3)

This invention relates to fluid seals of the type intended for insertion into the annular space between a shaft and a housing wall through which the shaft extends and to establish such engagement with both the shaft and housing as to permit free motion of one with respect to the other and yet prevent the escape of any fluid through the annular space.

The present application constitutes a continuation in part of my co-pending application Serial No. 179,736, filed December 14, 1937, and which issued on July 5, 1938, as Patent No. 2,123,079.

An object of the present invention is to provide a unitary fluid seal of the type indicated wherein the number of parts is reduced to a minimum and the parts are so inter-associated that their assembly is materially simplified.

A further object in this connection is to completely preform those portions of the cage structure which define the groove within which both the sealing member and its associated spring are disposed, thus eliminating the necessity of any forming or bending operation upon those portions of the device during assembly.

A further object is to reduce to a minimum the number of die-formed parts required and provide a structure using strip stock in certain parts.

A more detailed object is to provide a fluid seal of the general character indicated wherein the flexible sealing member is gripped in a groove defined by cooperating elements one of which is inserted into the other to lock an edge of the sealing member by means of the wedging action thus developed, and wherein the same inserted member also serves as the retainer for the spring, the function of which is to press the sealing member into sealing engagement with the moving cylindrical surface.

A still further object of the present invention is to provide a device wherein the locking or wedging member is formed as a portion of an extension or adapter whereby a single stock size of fluid sealing device can be adapted to a range of sizes of housing openings, or to a range of sizes of shaft.

A further object is to provide a structure in which an adapter or spacer between the housing bore and the oil seal proper also functions as one of the securing inner members of the latter.

The invention possesses other objects and features of advantage, some of which, with the foregoing, will be set forth in the following description of the preferred forms of my invention which are illustrated in the drawing accompanying and forming a part of the specification. It is to be understood that I do not limit myself to the showing made by the drawing and descriptions as I may adapt a variation of the preferred forms within the scope of my invention as set forth in the claims.

Referring to the drawing:

Fig. 1 is a view in perspective of one form of fluid seal incorporating principles of the present invention with a transverse portion broken away;

Fig. 2 is a view similar to Fig. 1 but showing a slightly modified form of fluid seal; and Fig. 3 is a view similar to Fig. 1 and showing a further modification.

The present invention contemplates the provision of a unitary fluid sealing device adapted for press fit insertion within the opening of a housing, or upon the shaft which extends through that opening, for the purpose of preventing the escape of fluids around the shaft and through the opening and yet permitting free relative movement between the housing and the shaft. The present invention provides a fluid seal, the constituent parts of which are so interassociated that the assembly operation is greatly simplified, this being accomplished principally through the expedient of preforming the parts as completely as possible so as to minimize the bending or forming operations required during assembly.

The seal is retained in a non-rotative position in the housing opening or upon the shaft by what is commonly known as a press or drive fit. The outside diameter of the cage on an "internal" seal is made several thousandths of an inch oversize to provide a press fit with the wall of the opening; and in the case of an "external" seal the inside cage diameter is made several thousandths of an inch undersize to provide a press fit upon the shaft. This drive fit provides a fluid-tight support for the flexible sealing member. The flexible sealing member makes a wiping contact with the other of the elements between which the seal is to be established, thus effectually preventing the escape of any fluid therebetween.

Whereas the flexible sealing member is herein spoken of as the sealing "leather" it should be understood that this word is not used in a limitative sense but merely as descriptive of any suitable flexible material, natural or synthetic, having the desired properties of resiliency, flexibility, non-abrasiveness, non-porosity and the like, which adapt it for use for the purpose intended.

Fig. 1 illustrates one form of my invention embodied as a fluid seal of the internal type. It is made up of two cage members, preferably stampings, a sealing member, and a spring member. The outside diameter of the cage is preferably a few thousandths of an inch oversize with respect to the opening in which it is to be inserted so as to establish the desired drive fit.

The inner case 48 is formed with an axial portion 47 and a spaced axial portion 51 connected by radial wall 49. It also has radial wall 8 which is relatively short because the position of the inturned axial flange 9 formed thereon is determined by the thickness of the sealing member to be held therein.

The flexible sealing member or leather 11 illustrated is of the "s" type, that is, it is substantially S-shaped in cross-section and preferably is lacking any radial flange portion, but is clamped in an axial groove. One end of the leather 11 rests against the radial wall 8 and the short axial flange 9 supports it on its inner surface.

Where the sealing member does not possess sufficient resiliency or natural contractive tendency around the shaft being sealed, I employ a finger spring 22 positioned on top of the sealing member. One edge of the spring is positioned within the groove, the opposite walls of which are defined by the flange 9 and the wedging member 54. The other edge of the spring 22 is serrated, that is, is provided with a large number of relatively closely spaced slits 21, thus defining numerous fingers 22. These fingers 22 press inwardly against the leather 11 and resiliently press it into the desired engagement with the shaft 14.

The other cage member comprises the peripheral wall 53, radial wall 52 and the wedging portion 54. The length of walls 49 and 52 may be regulated to suit the particular installation. For example, in a rear axle construction, there is often a considerable gap between the housing and the point on the shaft where it is desired to effect the sealing. This present type of structure admirably suits this purpose. The wedging flange 54 is held in place by the spun over edge 58 on the peripheral wall 63.

The parts are so proportioned and arranged that the radial distance between the inner face of the cylindrical cage portion 47 and the inner face of the axial flange 9 is slightly more than the thickness of the leather 11, hence, when the wedging member 54 is forced into the axial groove, over the outside face of the leather 11 or the spring 22 as the case may be, until the leading edge of member 54 substantially abuts radial flange 8, the leather 11 will be compressed by the squeezing action developed upon it. Preferably, the axial flange 9 is disposed obliquely, that is, it extends from the flange 8 in a direction slightly away from the adjacent surface being sealed so that when the wedging action is developed, the edge of the flange 9 embeds itself in the leather 11, thus firmly locking the leather 11 against displacement from the cage and holding the two parts effectually against relative rotation.

The wedging member 54 is secured in place by spinning over flange 58.

As pointed out hereinabove two of the principal objects achieved by the present invention are to simplify the process of assembly by preforming the cage in such a manner that no deformation or bending of the metal clamping parts is necessary as a portion of the assembly operation. Heretofore it has been customary to clamp the barrel type sealing leather within the cage by a spinning or bending operation after the leather had been inserted. In the present case, however, such embedment is secured by the simple wedging action developed when the wedge member 54 is forced into the groove.

Where it is desired to seal against the housing bore and not on the shaft as in the construction just described, the parts are simply reversed and the press fit is established between the shaft 14 and the corresponding peripheral surface 53. This reversal of the parts will be obvious to the man skilled in the art and is intended to be embraced in the claims appended hereto.

The modifications illustrated in Figs. 2 and 3 are similar in most particulars to the construction of Fig. 1.

In Fig. 2, the construction is quite similar to that of Fig. 1, with the exception that the outer cage 61 is provided with only a relatively narrow radial flange 62, whereas the flanges 63 and 64 of the wedging member 66 correspond to the flanges 52 and 53 respectively. Inasmuch as it is the flange 64 which here establishes the drive or press fit in the housing, it is preferable to provide a reinforcing flange 68 on the edge of the fitted flange 64, strengthening it against collapse. In order to hold the parts together as assembled, the flanges 62 and 63 may be fastened together as by spot welding 67. Here, too, the balance of the parts are like Fig. 1 and have the same reference numerals applied.

In Fig. 3, a garter spring 71 is employed instead of the finger spring so far described for the other modifications. However, here again the spring is retained within the cage 72 and in operative engagement with the flexible sealing member 73 by the wedging strip 74. For this purpose, an inwardly extending, preferably sloping portion 76 is formed on the trailing edge of the wedging strip 74, to extend inwards past at least the outer periphery of the garter spring 71 and thus retain the latter in operative position on the sealing member.

This sloping portion 76 also provides a convenient annular recess 77 in the outer surface of the locking strip 74 into which the extreme edge 78 of the cylindrical portion 79 of the cage 72 can be upset, so as to lock the parts in assembled relation. Here again, the fluid seal can be adapted to any shaft-to-housing clearance simply by changing the length of flange 81.

It should also be understood that any or all of the forms of Figs. 1, 2 and 3 can be modified to take the form of the so-called "external" seals.

What I claim is:

1. A fluid sealing device adapted to seal between two relatively moving substantially concentric space apart cylindrical surfaces comprising an axially extending flexible sealing member arranged with one end in sliding, leak-proof fit with one of said cylindrical surfaces and the other end spaced slightly away therefrom, a cylindrical cage member having a radial and axial flange formed thereon and cooperating to define the bottom and one side of a clamping groove near said surface supporting said sealing member, spring means to urge said sealing member in sealing engagement with one of said cylindrical surfaces, and a cylindrical clamping flange disposed in nested relationship with said cage member and extending thereinto to form the other face of said clamping groove, said last-named flange having an integral radial wall and cylindrical peripheral wall, the latter being adapted for a nonrotative fit with one surface being sealed.

2. A fluid sealing device adapted to seal between two relatively moving substantially concentric cylindrical surfaces comprising an axially extending flexible sealing member arranged with one end in sliding, leak-proof fit with one of said cylindrical surfaces and the other end spaced slightly away therefrom, an annular cage member having a substantially cylindrical portion, a spaced axial flange supporting one side of said sealing member and a short connecting radial wall; and a second annular cage member having a substantially cylindrical portion nested with the aforesaid cylindrical portion thereby effecting a clamping of the sealing member between it and said axial flange when secured in place, a spaced axial peripheral wall adapted to fit the other surface being sealed, and a radial wall spacing said wall and said second named cylindrical portion to close the gap therebetween.

ALLISON DONHAM OWEN.